May 3, 1932.  F. C. FRANK  1,856,095

WHEEL

Filed June 16, 1930

INVENTOR.
FREDERICK C. FRANK
BY
M. W. McConkey
ATTORNEY

Patented May 3, 1932

1,856,095

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

WHEEL

Application filed June 16, 1930. Serial No. 461,342.

This invention relates to wheels and more particularly to airplane wheels.

The invention broadly comprehends a wheel comprising a two part casting, one part sleeved on the other and bolted or otherwise secured thereto. One part constitutes a hub and a brake drum and the other part a disk and a rim and these parts are assembled and connected to provide a wheel which will withstand heavy side and radial loads.

An object of the invention is to provide a wheel structure comprising a two part casting.

Another object of the invention is to provide a wheel having two separate castings, one including the hub and the other including the rim.

Another object of the invention is to provide a wheel structure designed to withstand heavy side loads as well as heavy radial loads.

An additional object of the invention is the provision of a wheel which is simple and inexpensive in structure, highly efficient in use, durable in service and a general improvement in the art.

Figure 1:
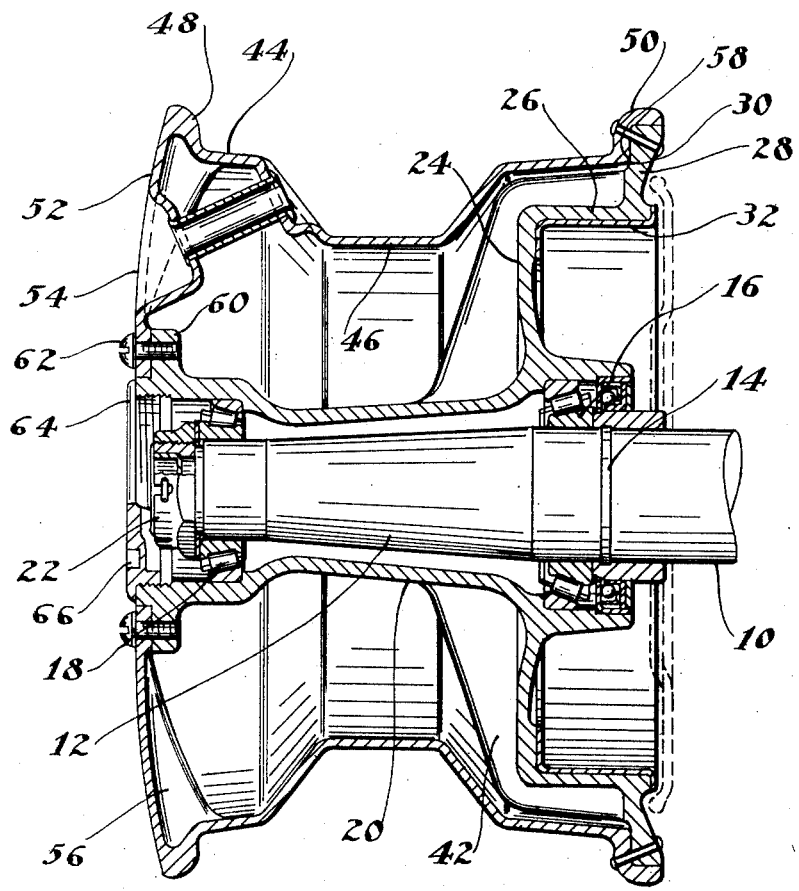
Figure 2:
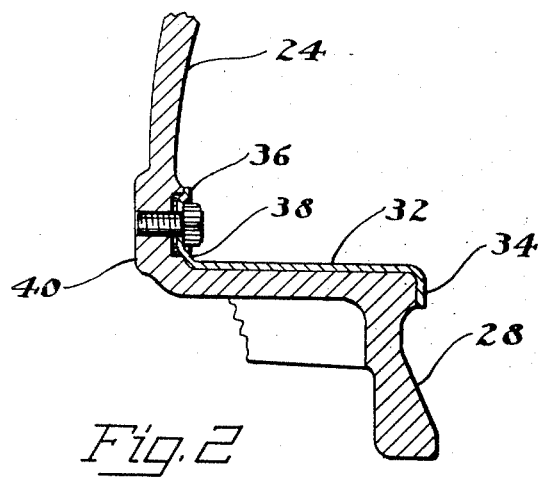

Other objects and advantages of the invention will more fully appear from the following description taken in connection with the accompanying drawings illustrating the preferred embodiment thereof, and in which:

Figure 1 is a vertical sectional view of a wheel mounted for rotation on the shaft illustrating the preferred embodiment of the invention; and Figure 2 is an enlarged detailed view illustrating means for securing the brake liner in position.

Referring to the drawings for more specific details of the invention, 10 represents an axle having a spindle 12 provided with a shoulder 14. Positioned on the spindle in spaced relation are roller bearings 16 and 18 and positioned for rotation on the bearings is a hub 20 secured against displacement by a retaining nut 22 threaded on the end of the spindle and engaging the inner race of the bearing 18.

As shown, the hub 20 has formed integral therewith, a cupped disk 24 supporting a drum 26 having a flange 28 provided with a shoulder 30. The drum 26 is provided with a liner 32 having flanges 34 and 36. The flange 34 abuts the edge of the drum 26 and the flange 36 is provided with swaged portions 38 adapted to engage depressions in the disk 24. These swaged portions serve to take the torque load on the brake liner and the liner is secured against endwise movement by studs 40 passing through the liner and threaded into the disk.

The disk supporting the drum and the flange formed on the drum are strengthened by a plurality of spaced radial ribs 42 connecting these members with the hub. These radial ribs materially strengthen the structure and enable the wheel to withstand heavy side and radial loads.

A rim 44 having a drop center 46 and tire retaining beads or flanges 48 and 50 is formed integral with a disk 52 having positioned therein a pocket 54, the object of which will hereinafter appear. Arranged on the disk 52 in spaced relation are a plurality of radial flanges 56 connecting the disk to the rim. These flanges materially strengthen the disk and the rim and carry at least a portion of the radial and side load imposed on the wheel.

The rim and the disk formed integral therewith is slipped over the axle and the drum. The rim is provided with a shoulder 58 seated on the periphery of the flange 28 and on the shoulder 30 thereon and these parts are secured together as by means of rivets. The disk 52 receives the end of the hub and engages a circumferential flange 60 formed on the hub to which it is suitably secured as by stud bolts 62 and threaded in the end of the hub is a stream line cap 64 having recesses 66 adaptable for the reception of a spanner wrench by means of which the cap may be threaded in position or removed.

It will be observed that the particular structure provides for the casting of a wheel in two independent parts. This is a material advantage in the production thereof. When a wheel is so formed or made, there are no shrink strains in any part and by reason of the radial webs or ribs formed integral with the hub, the drum and the drum flange and the radial ribs formed integral with the rim and the disk supporting the rim, the wheel will withstand very heavy side and radial loads.

While a preferred embodiment of the invention has been described, it is to be understood that this is given merely as an example of the underlying principles of the invention and since these principles may be incorporated in other specific mechanical structures, I do not intend to be limited to those shown, except as such limitations are clearly imposed by the appended claims.

Having thus described the various features of the invention, what I claim as new and desire to secure by Letters Patent is:

1. A wheel comprising two cast parts, one part including a hub, a brake drum thereon, a flange on the drum, said flange provided with a shoulder adjacent its outer edge, and spaced radial ribs connecting the hub, the drum and the flange and another part including a rim having a rim channel, tire retaining flanges, one of said flanges fitting over said drum flange and seated on said shoulder, said second mentioned cast part also including a disk and spaced radial ribs connecting the disk with the rim, the second part being slipped over the first part and secured thereto.

2. A wheel comprising two castings, one including a hub having a brake drum formed thereon and provided with a flange, a shoulder on the flange and spaced radial ribs connecting the hub, the drum and the flange, the other part including a rim having a drop center and tire retaining beads, a shoulder on one of the beads, a disk integral with the other bead, spaced integral webs connecting the disk and rim, the second part being slipped over the first part with the shoulder on the rim engaging the shoulder on the flange and means securing the parts together.

In testimony whereof, I have hereunto signed my name.

FREDERICK C. FRANK.